(12) United States Patent
He

(10) Patent No.: US 8,676,834 B2
(45) Date of Patent: *Mar. 18, 2014

(54) SET-LEVEL COMPARISONS IN DYNAMICALLY FORMED GROUPS

(75) Inventor: Bin He, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 190 days.

This patent is subject to a terminal disclaimer.

(21) Appl. No.: 13/028,948

(22) Filed: Feb. 16, 2011

(65) Prior Publication Data

US 2012/0209873 A1 Aug. 16, 2012

(51) Int. Cl.
*G06F 7/00* (2006.01)
*G06F 17/30* (2006.01)

(52) U.S. Cl.
USPC .......................................... 707/769; 707/715

(58) Field of Classification Search
USPC .................... 707/769, 715, 999.005
See application file for complete search history.

(56) References Cited

U.S. PATENT DOCUMENTS

| | | |
|---|---|---|
| 2002/0095421 A1 | 7/2002 | Koskas |
| 2005/0004907 A1 | 1/2005 | Bruno et al. |

OTHER PUBLICATIONS

Safiullah, "Efficient Processing of Set Queries Using Bitmap Index," Theses and Dissertations, Aug. 2008, Graduate School of The University of Texas at Arlington, Arlington USA.

Melnik et al., "Divide-and-Conquer Algorithm for Computing Set Containment Joins," Advances in Database Technology—EDBT 2002 Lecture Notes in Computer Science, 2002, 427-444, vol. 2287/2002 321-327, Springer-Verlag Berlin Heidelberg, Prague Czech Republic.

Stockinger et al., "Using Bitmap Index for Joint Queries on Structured and Text Data," New Trends in Data Warehousing and Data Analysis Series: Annals of Information Systems, 2009, 187-209, vol. 3.

Wu et al., "Encoded Bitmap Indexing for Data Warehouses," ICDE '98 Proceedings of the Fourteenth International Conference on Data Engineering, 1998.

Wu, "Query Optimization for Selections Using Bitmaps," ACM SIGMOD, 1999, 227-238, ACM, Philadelphia USA.

Wu et al., "On the Performance of Bitmap Indices for High Cardinality Attributes," Proceedings of the 30th VLDB Conference, 2004, 24-35, Toronto Canada.

Wu et al., "Optimizing Bitmap Indices with Efficient Compression," ACM Transactions in Database Systems, Mar. 2006, 1-38, vol. 31 No. 1, ACM, New York USA.

Safiullah, Muhammad Assad; "Set Predicates for SQL: A Simple and Efficient Approach to Enable Set Level Comparisons"; 2008.

Bin He, et al., "Set Predicates for SQL", Copyright 2008.

*Primary Examiner* — Alexey Shmatov

(74) *Attorney, Agent, or Firm* — Shimokaji & Associates, PC

(57) ABSTRACT

Systems are disclosed of processing a set-level query across one or more attributes, the query being grouped by one or more attributes, whereby groups that satisfy the set-level query may be aggregated over one or more attributes. The systems use bitwise arithmetic to efficiently traverse bitmap and bit-slice vectors and indexes of a data relation to determine groups that solve the set-level query.

4 Claims, 8 Drawing Sheets

400

| Student | Course | Grade | Semester |
|---------|--------|-------|----------|
| Mary    | CS101  | 4     | Fall09   |
| Mary    | CS102  | 2     | Spring10 |
| Tom     | CS102  | 4     | Fall09   |
| Tom     | CS103  | 3     | Spring10 |
| John    | CS101  | 4     | Spring08 |
| John    | CS102  | 4     | Fall09   |
| John    | CS103  | 3     | Spring10 |

| Student | | Course | | | Grade | | |
|---|---|---|---|---|---|---|---|
| $B_1$ | $B_0$ | $B_{CS101}$ | $B_{CS102}$ | $B_{CS103}$ | $B_2$ | $B_1$ | $B_0$ |
| 0 | 0 | 1 | 0 | 0 | 1 | 0 | 0 |
| 0 | 0 | 0 | 1 | 0 | 0 | 1 | 0 |
| 0 | 1 | 0 | 1 | 0 | 1 | 0 | 0 |
| 0 | 1 | 0 | 0 | 1 | 0 | 1 | 1 |
| 1 | 0 | 1 | 0 | 0 | 1 | 0 | 0 |
| 1 | 0 | 0 | 1 | 0 | 1 | 0 | 0 |
| 1 | 0 | 0 | 0 | 1 | 0 | 1 | 1 |

Input: Table $R(g, a, v)$ with $t$ tuples:
        Query $Q = \gamma_g, \oplus_a v \text{ } op \text{ } \{v^1, ..., v^n\} \text{ } (R)$:
        bit-sliced index BSI($g$), BSI($a$), and bitmap index BI($v$).

Output: Qualifying groups $g$ and their aggregate values $\oplus_a$

/* $gID$: array of size $t$, storing the group ID of each tuple */
    /* $A$: hash table for aggregate values */
    /* $M$: hash table for constant value masks */
    /* $G$: hash table for boolean indicators of qualifying groups */
    /* Step 1, get the vector for each constant in the predicate */
1:  for each $v^j$ do
2:      $vec_{v^j} \Leftarrow$ QUERYBI (BI($v$), $v^j$)
    /* Step 2, get the group ID for each tuple */
3:  Initialize $gID$ to all zero
4:  for each bit slice $B_i$ in BSI($g$), $i$ from 0 to $s$-1 do
5:      for each set bit $b_k$ in bit vector $B_i$ do
6:          $gID[k] \Leftarrow gID[k] + 2^{i-1}$
7:  for each $k$ from 0 to $t$-1 do
8:      if group $gID[k]$ is not in hash table $A.M.G$ then
9:          Initialize $A[gID[k]]:M[gID[k]] \Leftarrow 0$:
10:        $G[gID[k]] \Leftarrow (op \text{ is} \subseteq)$
    /* Step 3. find qualifying groups */
11:  if $op \in \{\supseteq, =\}$ then
12:      for each bit vector $vec_{v^j}$ do
13:         for each set bit $b_k$ in $vec_{v^j}$ do
14:            $M[gID[k]] \Leftarrow M[gID[k]] \text{ } | \text{ } 2^{i-1}$
15:      for each group $g$ in hash table $M$ do
16:         if $M[g] == 2^n - 1$ then $G[g] \Leftarrow True$
17:  if $op \in \{\subseteq, =\}$ then
18:      for each set bit $b_k$ in $\sim(vec_{v^1} | ... | vec_{v^n})$ do
19:         $G[gID[k]] \Leftarrow False$
    /* Step 4. aggregate the values of $a$ for qualifying groups */
20:  for each $k$ from 0 to $t$-1 do
21:      if $G[gID[k]]$ then
22:         $agg \Leftarrow 0$
23:         for each slice $B_i$ in BSI($a$) do
24:            if $b_k$ is set in bit vector $B_i$ then $agg \Leftarrow agg + 2^{i-1}$
25:         $A[gID[k]] \Leftarrow A[gID[k]] \oplus agg$
26:  for every group $g$ in hash table $M$ do
27:      if $G[g]$ then print ($g. A[g]$)

FIG. 8

SET-LEVEL COMPARISONS IN DYNAMICALLY FORMED GROUPS

BACKGROUND

The present invention relates to systems of solving a set-level query in a database, and more specifically, to a system for efficiently computing a set comparison within a predicate associated with a GROUP BY using a bit-map index, and generalizations thereby to more complex queries.

Simple query language (SQL) supports the selection of tuples using conditions on each tuple (i.e., the predicates in WHERE), and a group of tuples (i.e., the predicates in HAVING). The comparison of conditions in a predicate, even for a group of tuples, is performed at a scalar level. In other words, for each comparison, only one value extracted or aggregated from one column is compared to another. Such scalar level predicates become increasingly inadequate to support a new class of operations that require set-level comparison semantics (i.e., comparing a group of tuples with multiple values). Complex SQL queries composed by scalar-level operations are often formed to obtain very simple set-level semantics. Such queries are not only difficult to write, but also challenging for a database engine to optimize, and may therefore result in costly evaluation.

Conventional methods include scanning a bitmap index of the grouping attributes in a hierarchical manner. During this scanning, the bitmap index of the set predicate attributes is used to help pruning and boost the performance of a query. More specifically, the scanning first checks the first bitmap vector of the grouping attribute, and then the second bitmap vector, and so on, through the last bitmap vector. When there are n bitmap vectors for the grouping attributes, the scanning is essentially a complete tree traversal with depth n. The set predicate condition, however, can be used to prune most tree paths, and thus can have certain efficiency benefits in practice. This is true, however, only when the set predicate condition is very selective (i.e., only a small percentage of groups satisfy the condition).

There is a high demand for querying data with the semantics of set-level comparisons. By way of example, a company may want to search a resume database for candidates having a set of mandatory skills; an executive may want to find a department whose monthly average customer service ratings in a year have been good and bad (i.e., the rating subsumes {excellent, poor}); or an online advertising marketing strategist may want to find websites that publish ads for ING and Emigrant, but not HSBC.

In a typical database design that does not include explicit support of set-level attributes, set-level attributes are often modeled as a separate table. For example, a table Resume_Skills (id, skill) can be used to connect a set of skills to job candidates, who are identified by id, in another table. Here, a GROUP BY clause may be used to dynamically group tuples by id, with the values on attribute skill in the same group forming a set. Current implementations of a GROUP BY clause can only perform scalar value comparison by an accompanying HAVING clause. By way of further example, SUM, COUNT, AVG, and MAX functions will produce a single numeric value that is compared to a constant or other single aggregate value. Therefore, a set-level comparison such as the set of skills subsuming {'Java programming', Web services'} cannot be accommodated without complex SQL queries.

Set-valued attributes provide, however, a concise and natural way to model complex data concepts. Database management systems (DBMS) support attributes involving a set of values (e.g., nested table in Oracle, and SET data type in MySQL). In the above example, the "skill" attribute can be defined as a set data type. Set processing may be performed on a set-valued attribute and a set containment join, which is a join operation between the set-valued attributes of two relations, where the join condition is specified by set containment relationship. Set-value attributes together with set containment joins may be used to support set-level comparisons, but doing so has inherent limitations: 1) set-value attributes must be pre-defined at the schema definition time, and 2) a set can only cover one attribute and cannot be across multiple attributes. Therefore, users can not form dynamic set-level comparisons based on their query needs due to limitations caused by the database schema, and set-level comparisons are only possible on set-valued attributes.

For real-world decision making, groups and corresponding sets are often dynamically formed according to the query needs. In the above customer service example, sets are formed by departments (i.e., the monthly ratings of each department form a set). In a different query, the sets may be formed by individual employees. It is self-evident that pre-defined set-valued attributes cannot support such dynamic set formation.

Additionally, a definition of a set may be across multiple attributes. In the online advertisement example above, a strategist may want to discover the websites that publish ads for ING with good profit returns, because those are proven to be profitable with bank ads. In this case, the set is defined over both the advertiser and the profit attribute. Many systems only provide a set-valued attribute defined on a single attribute, and therefore cannot capture the cross-attribute association in the above example. Nested tables in Oracle allow sets over multiple attributes, but do not easily support set-level comparisons on such attributes.

As can be seen there is a need for an improved system and method of performing set-level comparison operations.

BRIEF SUMMARY

In yet another aspect of the present invention, a computer readable media having instructions for causing a computer to execute steps comprises instructing a database management system to process a query for determining a group that satisfies a set predicate condition on an attribute, the database management system operable to: obtain a bitmap vector of an attribute in the set predicate condition; determine a group identification of each tuple in the group; determine the group that satisfies the set predicate condition; and determine an aggregate value of an aggregating attribute of the determined group.

In still another aspect of the present invention, a system for processing a query having a set predicate condition comprises a server; a storage unit; and a network configured to provide communication between the server and the storage unit, wherein the server includes a database management system configured to determine a group satisfying the set predicate condition on an attribute configured to execute the following steps: obtaining a bitmap vector of an attribute in the set predicate condition; determining a group identification of each tuple in the group; determining the group that satisfies the set predicate condition; and determining an aggregate value of an aggregating attribute of the determined group.

These and other features, aspects and advantages of the present invention will become better understood with reference to the following drawings, description, and claims.

BRIEF DESCRIPTION OF THE DRAWINGS

FIG. 4 shows a student-course table containing sample data referred to in illustrations herein;

FIG. 6 shows a bitmap index of the values of the student-course table of FIG. 4;

FIG. 8 shows a pseudo code listing of an implementation of the method of FIG. 7;

DETAILED DESCRIPTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features. However, any single inventive feature may not address any of the problems discussed above or may only address one of the problems discussed above. Further, one or more of the problems discussed above may not be fully addressed by any of the features described below.

Figure 1:
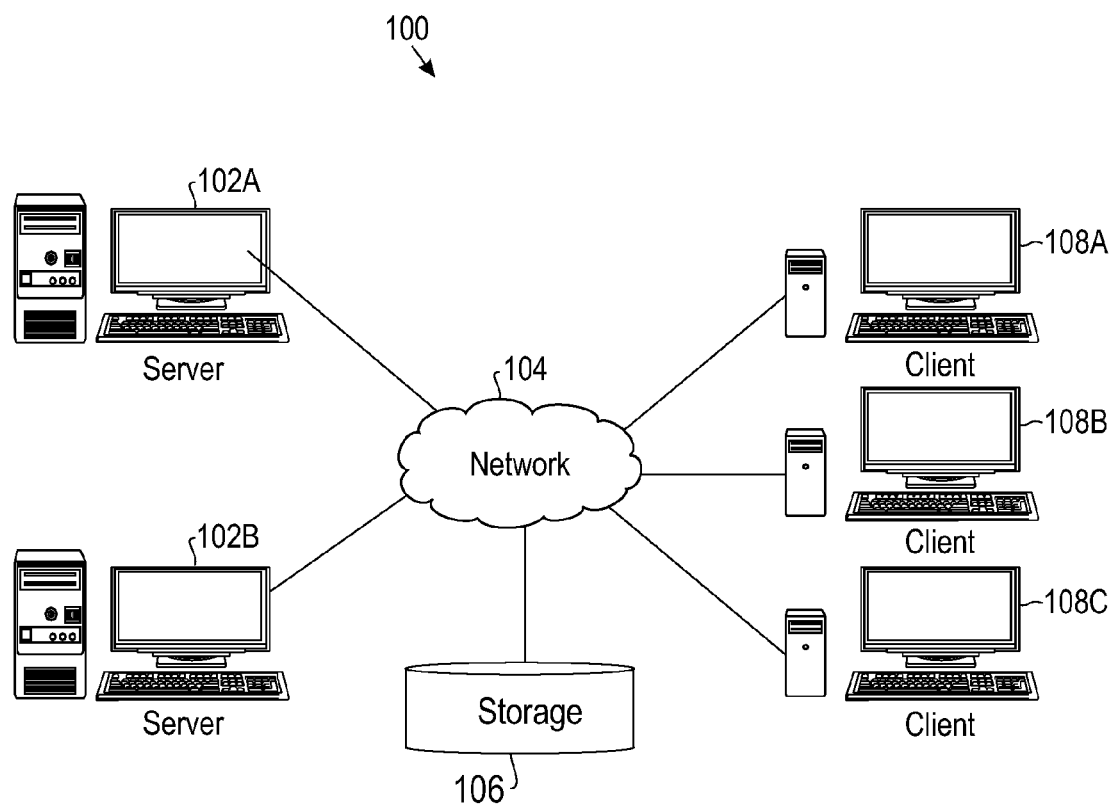
FIG. 1 shows a system diagram of a network of data processing systems according to an embodiment of the present invention.

Embodiments of the present invention may be implemented in systems that may include, for example, a database management system or a data warehousing solution. Referring now to FIG. 1, a system diagram of a data processing system 100 is shown according to an embodiment of the present invention. System 100 may be a network of computers in which embodiments of the present invention may be implemented. System 100 may include a network 104, which may be a medium for providing communication between various devices and computers connected thereto. Network 104 may include connections including, for example, wire, wireless communication links, or fiber optic cables.

System 100 may include servers 102A and 102B connected to, or in communication with, network 104. Servers 102A and 102B may be a computer or computing device that may provide data, boot files, an operating system, a database management system, and applications. Network 104 may be connected to, or in communication with clients 108A-108C, which may be, for example, personal computers, network computers, virtual machines, or applications that may use or access resources on servers 102A-102B. System 100 may include a storage unit 106 connected to, or in communication with, network 104. Storage 106 may provide data storage for servers 102A-102B and clients 108A-108C, and may include, for example, magnetic, optical, solid state, or removable storage. System 100 may include fewer or additional servers 102, clients 108, storage units 106, networks 104, or other devices not shown.

Figure 2:
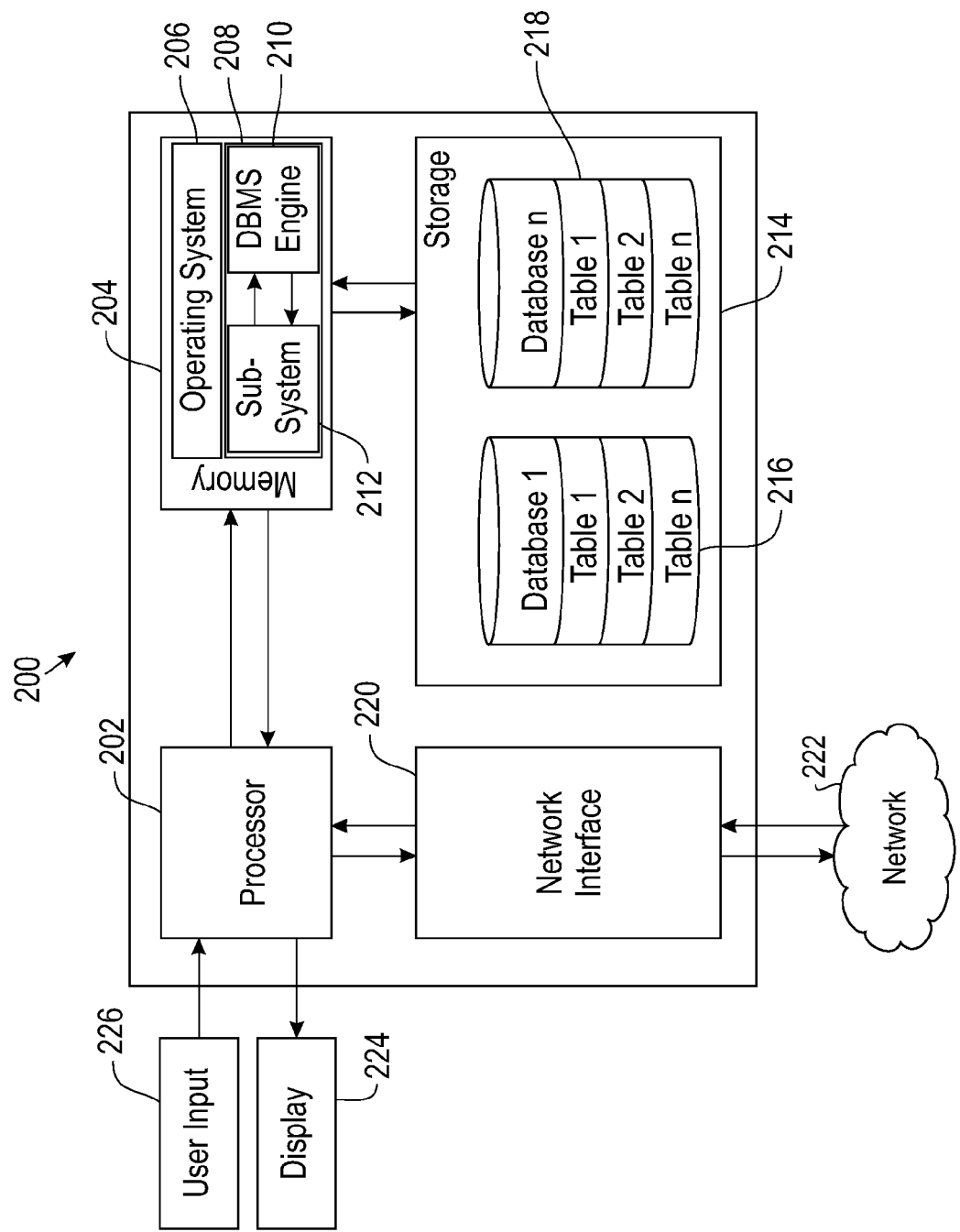
FIG. 2 shows a block diagram of a computer according to an embodiment of the present invention.

Referring now to FIG. 2, a block diagram of a computer 200 according to an embodiment of the present invention is shown. Computer 200 may include a processor 202 coupled to, or in communication with, a memory 204, which may be coupled to, or in communication with a data storage device 214. Processor 202 may represent one or more processors (e.g., microprocessors), and memory 204 may represent random access memory devices, for example, comprising the main memory storage of computer 200 as well as supplemental levels of memory (e.g., cache memories, nonvolatile memories, read-only memories, programmable or flash memories, or backup memories). Memory 204 may include memory storage physically located in computer 200 including, for example, cache memory in a processor 202, any storage used as virtual memory. Data storage device 214 may include magnetic, optical, solid state, or removable storage.

Computer 200 may include a user input 226 and display 224 for interfacing with a user, operator, or computer readable media. User input 226 may include, for example, a keyboard, a mouse, a touchpad, a track point, a trackball, a joystick, a keypad, a stylus, a floppy disk drive, an optical disk drive, or a removable storage device. User input 226 may be capable of receiving and reading computer readable media. Display 224 may include, for example, a cathode ray tube (CRT) monitor, a liquid crystal diode (LCD) display panel, a plasma screen, and an organic light emitting diode (OLED) panel. Computer 200 may connect to, or interface with, user input 226 and display 224 through a direct connection, a wireless interface, or through a terminal connected directly or remotely to computer 200 for example. Computer 200 may communicate with a network 222, for example through a network interface card 220.

Computer 200 may operate under control of an operating system 206, and execute or otherwise rely upon various software applications, components, programs, objects, modules, or data structures including, for example, database management system 208 (DBMS). DBMS 208 may be in communication with data storage device 214, and DBMS 208 may have a DBMS engine 210 that may be in communication with a subsystem 212. Subsystem 212 may comprise a plurality of subsystems including, for example, a data definition subsystem, data manipulation subsystem, application generation subsystem, and data administration subsystem. Subsystem 212 may maintain a data dictionary, file structure and integrity, information, an application interface, a transaction interface, backup management, recovery management, query optimization, concurrency control, and change management of databases 216 and 218. DBMS engine 210 may accept logical requests from subsystem 212; convert the logical requests into physical equivalents; and access databases 216 and 218 and their respective data dictionaries accordingly. It should be appreciated that system 100 and computer 200 are intended to be exemplary and not intended to imply or assert any limitation with regard to the environment in which embodiments of the present invention may be implemented.

Broadly, embodiments of the present invention generally provide a method and system of solving a set predicate condition in the HAVING clause, which may accommodate set-level comparisons. A method and system to solve the set predicate query according to an embodiment of the present invention may use a bitmap index and may involve selecting a bitmap vector from a bitmap index of a table or relation for an attribute in the set predicate condition; collecting the group identifications of tuples in a group and storing the collected group identifications in an array; finding the qualifying groups by iterating through the selected bitmap vector, setting bits in a bit string of an entry in a mask table, and performing binary arithmetic on either entries of the mask table or the selected bitmap vector to determine entries for a group table;

and iterating through entries in the group table to perform aggregating operations on specified attributes of qualifying groups.

Set Predicates:

In an embodiment of the invention, a SQL query using a set data type may be constructed to find, for example, the candidates with skills "Java programming" and "Web services", as follows:

```
SELECT id FROM Resume_Skills GROUP BY id
    HAVING SET(skill) CONTAIN {'Java', 'Web services'}
```

Given the above query, after the grouping, a dynamic set of values on the attribute skill is formed for each unique id, and the groups whose corresponding SET (skill) contain both "Java programming" and "Web services" are returned as query answers. For the decision making example, suppose we have a table Ratings (department, avg_rating, month, year). The following exemplary query finds the departments whose monthly average ratings in 2009 have always been poor (assuming the rating is from 1 to 5):

```
SELECT department FROM Ratings WHERE year = 2009 GROUP BY
department HAVING SET(avg_rating) CONTAINED BY {1, 2}
```

In this query, CONTAINED BY is used to capture the set-level condition. Set predicates may cover multiple attributes. Consider the online advertisement example above. Suppose the table is Site_Statistics (website, advertiser, CTR) wherein CTR refers to click through rate. To find the Websites that publish ads for ING with more than 1% click-through rate (CTR) but do not publish ads for HSBC, the query may be:

```
SELECT website FROM Site_Statistics GROUP BY website
HAVING SET(advertiser, CTR) CONTAIN {('ING', (0.01,+))} AND
NOT
(SET(advertiser) CONTAIN {'HSBC'})
```

In this example, the first set predicate involves two attributes and the second set predicate has the negation of CONTAIN. Note that we use (0.01, +) to represent the partial condition CTR>0.01.

Without the explicit notion of set predicates, the query semantics may be captured by using sub-queries connected by SQL set operations (UNION, INTERSECT, EXCEPT), in coordination with join and GROUP BY. Such queries may be quite complex for users to formulate and may be difficult to optimize for a database engine, thus resulting in unnecessarily costly evaluation. On the contrary, the set predicate construct according to embodiments of the present invention explicitly enables set-level comparisons. The concise syntax makes query formulation simple and also facilitates the efficient native support of such queries in a query engine.

Syntax of Set Predicates

Embodiments of the present invention extend the SQL syntax to support set predicates. Since a set predicate may compare a group of tuples to a set of values, the set predicate fits well into the GROUP BY and HAVING clauses. Specifically in the HAVING clause there may be a Boolean expression over multiple regular aggregate predicates and set predicates, which may be connected by logical operators ANDs, ORs, and NOTs. The syntax of a set predicate may be:

```
set_predicate ::= attribute_set set_operator constant_values
attribute_set ::= SET(v_1, ..., v_m)
set_operator ::= CONTAIN | CONTAINED BY | EQUAL
constant_values ::= {(v_1^1, ..., v_1^m, ..., (v_n^1, ..., v_n^m)},
```

Where $v_i^j$ may be a member of a domain $(v_i)$, i.e., each $v_i^j$ may be a value (integer, floating point number, string, etc.) in the domain of attribute $v_i$. Succinctly, a set predicate may be denoted by $(v_1, \ldots, v_m)$ op $\{(v_1^1, \ldots, v_m^1), \ldots, (v_1^n, \ldots, v_m^n)\}$, where op may be the set operator CONTAIN, CONTAINED BY, and EQUAL.

Figure 3:
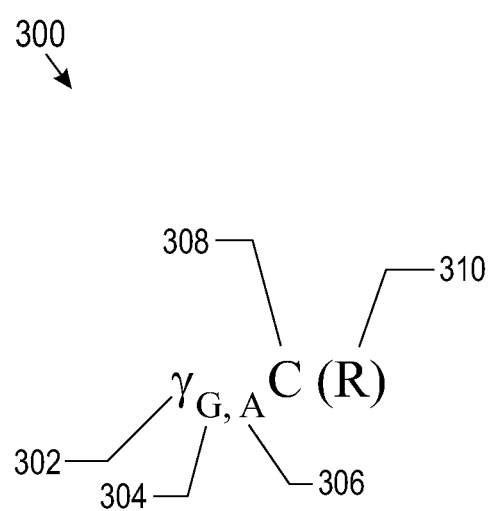
FIG. 3 shows a syntax of an exemplary query on set predicates according to an embodiment of the present invention.

Referring now to FIG. 3, embodiments of the present invention provide an extension of the syntax of relational algebra with an exemplary query 300 to include set predicates for a concise representation of queries. Given relation R, the grouping and aggregation may be represented by query 300.

Where operator 302 (lower case gamma) is the new operator, G may be a set of grouping attributes 304, A may be a set of aggregates 306 (e.g., COUNT(*)), and C may be a Boolean expression 308 over set predicates and conditions on aggregates (e.g., AVG(grade)>3), which may overlap with the aggregates in A. R may be a table relation 310, which may also be a result of an arbitrary query.

Single Predicate Set Operation

With reference now to FIG. 4, a student-course table 400 is shown with columns including data (e.g., student, course, grade). (Note that in examples of the code, queries, etc. given below, "SC" refers to this student-course table 400.) An example of an SQL query with set predicates operating over student-course table 400 is query Q1, 502 shown in FIG. 5, which identifies the students who have taken both CS101 and CS102. The results are Mary and John. The keyword CONTAIN represents a superset relationship, i.e., the set variable SET(course) is a superset of {'CS101', 'CS102'}.

```
Q1: SELECT student FROM SC GROUP BY student
    HAVING SET(course) CONTAIN {'CS101', 'CS102'}
```

A more general query may include the regular WHERE clause and conditions on aggregate functions in HAVING. In the following exemplary query Q2, 504 shown in FIG. 5, the query looks for students having an average grade higher than 3.5 in FALL09 and having taken both CS101 and CS102 in that semester. The query also returns the number of courses the students took in that semester.

```
Q2: SELECT student, COUNT(*) FROM SC
WHERE sem = 'Fall09' GROUP BY student
HAVING SET(course) CONTAIN {'CS101', 'CS102'} AND
AVG(grade)>3.5
```

We use CONTAINED BY for the reverse of CONTAIN, i.e., the subset relationship. The following exemplary query Q3, 506 shown in FIG. 5, selects all the students whose grades are never below 3. The results are Tom and John. Note that set predicates follow set semantics instead of bag semantics, therefore John's grades, {4, 4, 3}, are subsumed by {4, 3}.

Q3: SELECT student FROM SC GROUP BY student
HAVING SET(grade) CONTAINED BY {4, 3}

Figure 5:
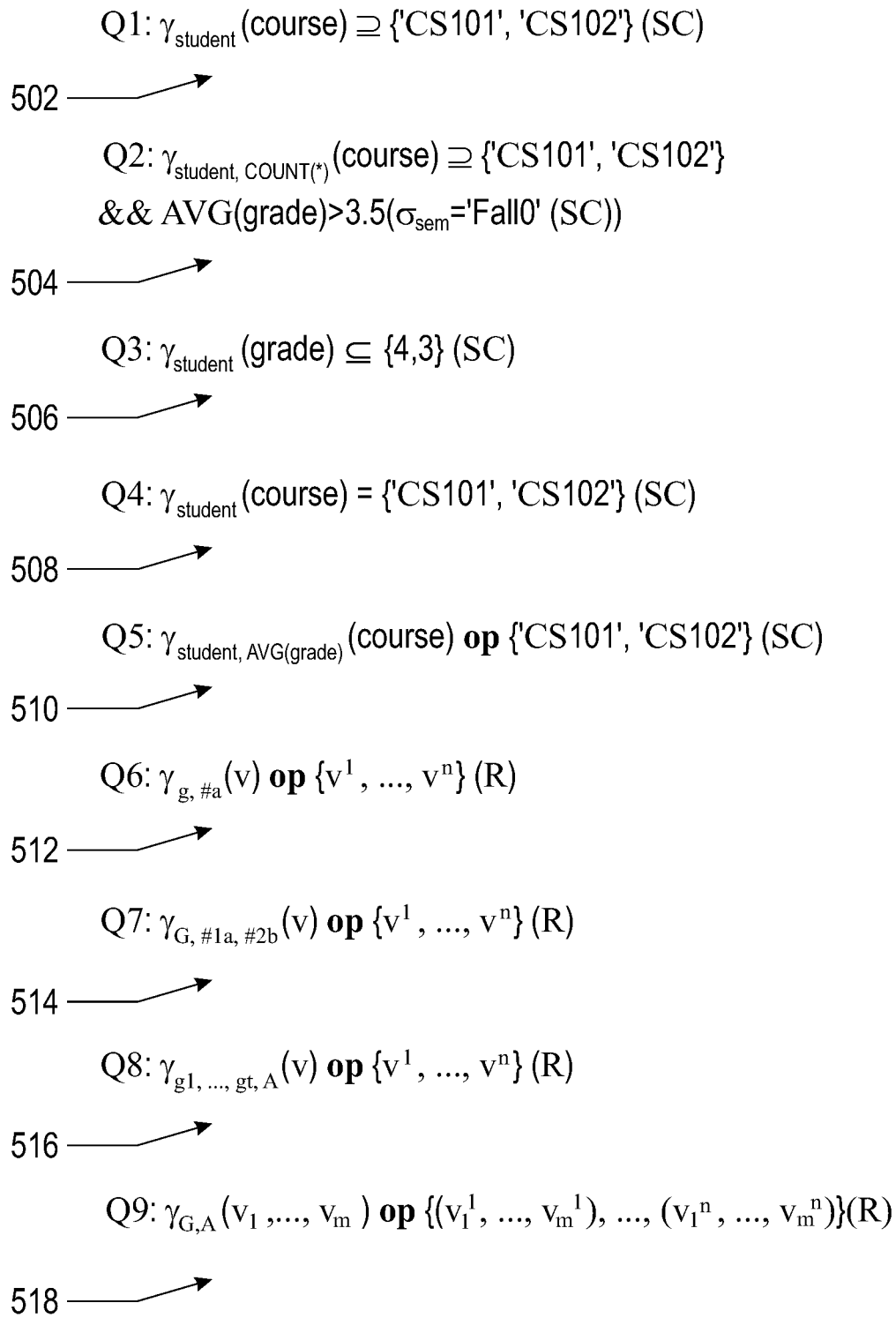
FIG. 5 shows queries on a set predicate according to an embodiment of the present invention.

To select all the students that have taken CS101 and CS102 and no other course, the following exemplary query Q4, 508 shown in FIG. 5, uses EQUAL to represent the equal relationship in set theory. Its result contains only Mary.

Q4: SELECT student FROM SC GROUP BY student
HAVING SET(course) EQUAL {'CS101', 'CS102'}

Multi-Predicate Set Operation:

A query with multiple set predicates may be supported by using Boolean operators therewith (i.e., AND, OR, and NOT). For example, to identify all the students who did not take both CS101 and CS102 AND whose grades are never below 3, the query NOT (SET(course) CONTAIN {'CS101', 'CS102'}) AND SET(grade) CONTAINED BY {4, 3} may be used.

Multi-Attribute Set Operation:

The query syntax also allows cross multiple attribute comparisons, e.g., we use SET(course, grade) CONTAIN {('CS101', 4), ('CS102', 2)} for all the students who received grade 4 in CS101 but 2 in CS102.

Constant Values from Subqueries and in Ranges:

The constant values in the set predicate may be from a result of a subquery, e.g., SET(course) CONTAIN (SELECT course FROM basic_course). Moreover, for data types such as numeric attributes and dates, the constant value may be a range. One example is the online advertisement query.

Bitmap Index-Based Approach

According to embodiments of the present invention, one approach to processing set predicate queries is using a bitmap index (BI). Given a bitmap index on an attribute, there exists a bitmap, a vector of bits, for each unique attribute value. The length of the vector equals the number of tuples in the relation. In the vector for value x of attribute v, its ith bit is set to 1, when and only when the value of v on the ith tuple is x, otherwise the ith bit is set to 0. With bitmap indexes, complex selection queries may be efficiently answered by calculating bitwise operations (AND (&), OR(|), XOR(^), and NOT(~)) over the bit vectors. Moreover, bitmap indexes enable efficient computation of aggregates such as SUM and COUNT.

Using a bitmap index to process set predicates may offer several advantages: (1) Only the bitmap indexes on columns involved in the query need to be accessed, therefore the query performance is independent of the width of the underlying table. (2) The data structure of a bit vector is efficient for basic operations such as membership checking (for matching constant values in set predicates). Bitmap index gives us the ability to skip tuples when the tuples are irrelevant. Given a bit vector, if there are groups of 0's, they may be skipped together due to effective encoding of the vector. (3) The simple data format, bitmap operations, and bitwise arithmetic may make it convenient to integrate the various operations in a query, including the dynamic grouping of tuples and the set-level comparisons of values. Efficient and seamless integration with conventional operations such as selections, joins, and aggregates may be possible. (4) Straightforward extensions may handle features that may otherwise be complicated, such as multi-attribute set predicates, multi-attribute grouping, and multiple set predicates.

Bitmap compression methods and encoding strategies have broadened the applicability of bitmap indexes, and a bitmap index may be applied to attributes including, for example, high-cardinality categorical attributes, numerical attributes, and text attributes. Compressed bitmap indexes may provide many advantages including, for example, occupying less space than raw data, and providing better query performance for equality query, range query, aggregation, and keyword query.

A particular type of bitmap index that may be used is a bit-sliced index (BSI). Given a numeric attribute on integers or floating-point numbers, bit-slice indexes directly capture the binary representation of attribute values. The tuples' values on an attribute may be represented in binary format and kept in s bit vectors (i.e., slices), which represent $2^s$ different values. Categorical attributes may also be indexed by bit-slice indexes, with a mapping from unique categorical values to integer numbers.

Referring now to FIG. 6, an exemplary bitmap index 600 of some of the values of student-course table 400 is shown. Given a query Q5, 510 shown in FIG. 5, FIG. 6 shows the bitmap indexes on g(student), v(course), and a(grade). Bit-slice index BSI(student) may have two slices $B_1$, $B_0$. As an example, the fourth bits in $B_1$ and $B_0$ of BSI(student) may be 0 and 1 respectively. The fourth tuple may have value 1 on attribute student, which may represent 'Tom' according to the mapping of the original values from student-course table 400 to bitmap index 600. There may also be a BSI(grade) on grade. The bitmap index on course is not a BSI, but a regular bitmap index BI where each unique attribute value has a corresponding bit vector, e.g., a bit vector on $B_{CS101}$ is 1000100, indicating that the first and fifth tuples have 'CS101' as the value of course.

In embodiments of the present invention, bit-sliced indexes may be built on the grouping and aggregating attributes, g(BSI(g)) and a(BSI(a)), respectively, and there may be a bitmap index on attribute values v(BI(v)), which may be a bit-sliced index or any regular bitmap index. Embodiments of the present invention may use other types of bitmap indexes on g and v. An advantage of bit-sliced indexes is that they may index high-cardinality attributes with small numbers of hit vectors, thus improving the query performance if the grouping or aggregation is on such high-cardinality attributes.

Figure 7:
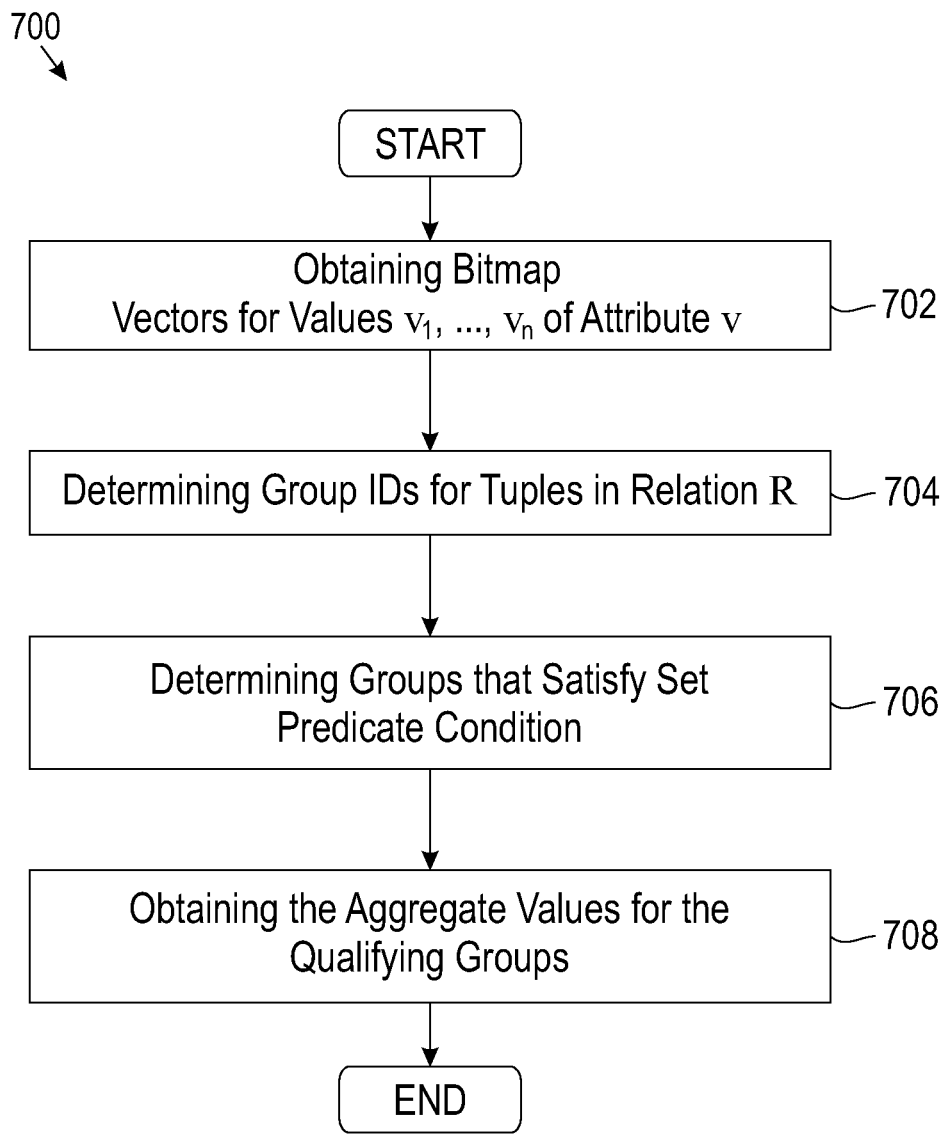
FIG. 7 shows a method according to an embodiment of the present invention.

Referring again to FIG. 5, an exemplary query Q6, 512 with only one set predicate is shown, where # may be an aggregating operator, and where op may be any of the set operators CONTAIN, CONTAINED BY, and EQUAL. FIG. 7 shows a process flow diagram of a method 700 of using a bitmap index for processing the set predicate query Q6, 512. FIG. 8 shows a pseudo code listing 800 of an implementation of method 700. Reference will be made to code listing 800 in the foregoing description.

Method 700 may include a step 702 of obtaining the bitmap vectors for attribute values v for $(v^1, \ldots, v^n)$ from the bitmap index for v. According to an exemplary embodiment of the present invention, step 702 may include querying the bitmap index BI(v) for $(v^1, \ldots, v^n)$ and collecting the vectors, $vec_vj$ for j from 1 to n. (See code listing 800, line 2).

Method 700 may include a step 704 of determining the group identifications (IDs) for tuples in the relation R by querying the bit-slice index for g. The group IDs may be calculated by iterating through the slices of BSI(g) and storing the group IDs in an array gID.

In an exemplary embodiment of the present invention, step 704 may include iterating through the bits of each slice of a bit-slice index of g, BSI(g). For each bit having a True value (i.e., value 1), a binary $2^i$ may be added to an array gID[k], for k from 0 to t−1 (for i from 0 to s−1, s being the number of slices of BSI(g)), thereby collecting group IDs across the bit-slice indexes of g in gID. (See code listing 800, lines 4-6). The resulting array gID may have group IDs corresponding to bit-slice index BSI(g). Method 700 may use a plurality of hash table objects A, M, and G. Step 704 may include initializing the hash tables A, M, and G. In an exemplary embodiment, initializing may be achieved by iterating through the array gID, and assigning the hash table entries for gID[k] with zeros (0). Hash map G may be initialized to ones (1) if the operator op of query Q6, 512 is CONTAINED BY. (See code listing 800, lines 7-10).

Method 700 may include a step 706 of determining groups that satisfy the set predicate condition by processing the bitmap vectors $vec_v j$ of the set predicate from step 702. Step 706 may differ based on the operator op, which may be CONTAIN, CONTAINED BY, or EQUAL.

A CONTAIN operation may be evaluated by examining the bits of the bitmap vectors of attribute values v from step 702, and setting corresponding bits in a mask to indicate a presence of values $v^1, \ldots, v^n$. Once the bitmap vectors have been examined, an evaluation of the mask value may determine whether the group satisfies the set predicate condition. If the condition is satisfied, a group table may be used to store this information.

According to an exemplary embodiment of the present invention, a solution to the CONTAIN operation may be implemented in step 706 by hash table M, which maintains a mask value M[gID] for each group g. The mask value may have n bits, which may correspond to the n constant values $(v^1, \ldots, v^n)$ in the set predicate. A bit in the mask value M[gID] may be set to 1 if there exists at least one tuple in group g that has the corresponding constant value on attribute v. For each set bit $b_k$ in vector $vec_v j$, the jth bit of M[gID[k]] may be set, which may be accomplished by evaluating a logical OR of bit $b_k$ and the jth bit of M[gID[k]] and storing the result back in the jth bit of M[gID[k]]. Once all the bitmap vectors $vec_v j$ have been examined, the entries of hash table M may be evaluated, and if all n bits are set for a particular entry in the hash table M, i.e., M[gID[k]] equals $2^n-1$, then the group g corresponding to gID[k] contains tuples matching every constant value in the set predicate, therefore satisfying the query. According to an exemplary embodiment, tuples, k, for qualifying groups gID[k], may have Boolean indicators recorded in hash table G indicating qualifying groups G[gID[k]]. (See code listing 800, lines 11-16).

A CONTAINED BY operation may be evaluated by performing a logical OR across each of the bits for a tuple in the bitmap vector from step 702, and finding the inverse, which will identify the non-qualifying groups. A group table, which may have been initialized to all True, may be used to track the non-qualifying groups, which may be disqualified, or marked as False.

According to an exemplary embodiment of the present invention, the CONTAINED BY operation may be implemented in step 706 by evaluating $\sim(vec_v 1 | \ldots | vec_v n)$ for the vectors $vec_v j$, which is the inverse of a logical OR of the vectors thereof. Each set bit $b_k$ in the resulting vector may be examined, and if the bit is True, then the particular group identified by gID[k] does not match any of the constants $v^1, \ldots, v^n$, and a False may be stored in hash table G[gID[k]]. (See code listing 800, lines 17-19).

An EQUAL operation may be implemented in step 706 as a combination of CONTAIN and CONTAINED BY since X EQUAL Y is equivalent to X CONTAIN Y and X CONTAINED BY Y. A group may be first marked as qualifying, or marked as True in hash table G, if the CONTAIN is satisfied, then of the qualifying groups, those that do not satisfy the CONTAINED BY operation are disqualified, or marked as False in hash table G. Groups in hash table G that are marked as True therefore satisfy the EQUAL condition.

Method 700 may include a step 708 of determining the aggregates for the qualifying groups using a bit-slice index on attribute a. Step 708 may identify qualifying groups in a group mask, and iterate through slices of the bit-slice index on attribute a for each tuple corresponding to the qualifying group, and aggregate the values thereof.

According to an exemplary embodiment, the bits across all slices of BSI(a) may be aggregated for a tuple of a qualifying group into hash table A as A[gID[k]]. Step 708 may examine each bit of the bit-slices of BSI(a) for qualifying tuple k. When the examined bit is True (i.e., value 1), $2^i$ may be added to the aggregate (for i from 0 to s−1, s being the number of slices of BSI(a)). (See code listing 800, lines 20-25). This may be efficiently implemented by iterating through the bits (k from 0 to t−1) of the slices simultaneously.

General Queries with Set Predicates

General query 300 may use multiple grouping attributes and multiple set predicates, wherein each predicate may be defined on multiple attributes. The general concepts described herein may be extended to accommodate such general queries.

Referring again to FIG. 5, a query Q7, 514 may return a plurality of aggregates $\#_1 a, \#_2 b$, which may be solved, for example, by repeating step 708 of method 700 for each aggregate, $\#_1 a$ and $\#_2 b$.

Multiple Attribute Grouping.

A query Q8, 516 having multiple grouping attributes, $g^1, \ldots, g^r$ may be treated as a single combined attribute g. The bit-slice indexes $BSI(g_1), BSI(g_r)$ may be concatenated to BSI(g). Referring again to FIG. 6, if the grouping condition is GROUP BY student, grade, then the concatenated BSI(g) may have 5 slices, which may be $B_1$(student), $B_0$(student), $B_2$(grade), $B_1$(grade), and $B_0$(grade). Therefore, the binary value of the combined group g of the first tuple is 00100. Method 700 may then proceed normally using the newly concatenated BSI(g).

Multi-Attribute Set Predicates.

For a query Q9, 518 having multiple attributes in defining the set predicate, a concatenation of $v_1, \ldots, v_m$ may be combined to attribute v. Vectors $vec_{v1} j, vec_{vm} j$ may be obtained by querying $BI(v_1), \ldots, BI(v_m)$. An intersection may be calculated by a bitwise AND of the vectors $vec_v j = vec_{v1} j \& \ldots \& vec_{vm} j$, which may result in vectors for tuples that match the multi-attribute constant $(v_1^j, \ldots, v_m^j)$.

Multi-Predicate Set Operation.

Given a query having multiple set predicates, the individual predicates may be evaluated independently to obtain the qualifying groups for each predicate. Then the logical operations between predicates may be performed over the qualifying groups.

In a general query, a HAVING clause may have conditions over regular aggregate expressions (e.g., AVG(grade)>3.5 in query Q2, 504). This clause may be solved the similar to how aggregates in SELECT clauses are solved. Multiple aggregates may be obtained for each group and collected in a hash table, and any group not satisfying the condition may be removed therefrom.

Using Conventional SQL Operations.

Given a general query 300, relation R 310 could be a result of other operations such as selects or joins. Logical bit vector operations may allow integration of the bitmap index-based method for set predicates with the bitmap index-based solutions for Boolean select conditions and join queries.

According to alternative embodiments of the present invention, alternative objects or data structures may be used in the implementation of embodiments of the present invention including, for example, a hash map, a linked list, a table, multi-dimensional array, or an associative array. Additionally, the order of operations may be modified to traverse, for example, elements of an array or hash table in an alternative sequence. These and other variations are variations of an implementation that may be accomplished by one having skill in the art are contemplated by aspects of this disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer program product for processing a query, said program product comprising a non-transitory computer readable storage medium having computer readable program code embodied therewith, said program code being executable by a computer to:
   instruct a database management system to process a query to determine groups that satisfy the query by satisfying a set predicate condition on a first attribute among a plurality of attributes by causing the database management system to:
      obtain a bitmap vector of the first attribute in the set predicate condition;
      create a mask that identifies the first attribute as corresponding to the obtained bitmap vector;
      store the mask in a mask table;
      determine a group identification of each of a plurality of tuples;
      determine a first group that satisfies the set predicate condition by applying the set predicate condition to each of a plurality of entries in the mask table;
      determine an aggregate value of an aggregating attribute of the determined first group;
      determine an index for each of a plurality of attributes in the first group; and
      create a combined index from a plurality of indexes that index the plurality of attributes in the first group.

2. The computer program product of claim 1, wherein the program code executable by the computer instructs the database management system to:
   determine a grouping attribute that identifies the first group for each of the plurality of tuples in the first group that satisfies the set predicate condition;
   create a bit-slice index of the grouping attribute for the first group;
   aggregate the values of a plurality of slices in the bit-slice index for the grouping attribute for the first group; and
   create a combined attribute that combines those of the plurality of attributes that identify the first group.

3. A system for processing a query, the query having a set predicate condition, comprising:
   a server;
   a storage unit; and
   a network, the network configured to provide communication between the server and the storage unit,
   wherein the server includes a database management system and the server is configured to:
      determine groups satisfying the set predicate condition on one of a plurality of attributes;
      obtain a bitmap vector of a plurality of attributes in a set predicate condition;
      determine a group identification of each of a plurality of tuples in the groups that satisfy the set predicate condition;
      determine a grouping attribute that identifies one of the groups that satisfy the set predicate condition for each of the plurality of tuples in the groups that satisfy the set predicate condition;
      create a bit-slice index of the grouping attribute for each of the groups that satisfies the set predicate condition;
      aggregate the values of a plurality of slices in the bit-slice index for the grouping attribute for each of the groups that satisfies the set predicates condition; and
      create a combined attribute that combines those of the plurality of attributes that identify the groups of tuples in the groups that satisfy the set predicate condition.

4. The system of claim 3, including:
   a mask table, wherein masks in the mask table identify the plurality of attributes in the set predicate condition, and
   wherein the server is further configured to determine that one of the groups satisfies the set predicate condition by applying the set predicate condition to each of a plurality of entries in the mask table.

* * * * *